United States Patent [19]

Cookson

[11] Patent Number: 4,554,399
[45] Date of Patent: Nov. 19, 1985

[54] PARTICLE TRAP FOR COMPRESSED GAS INSULATED TRANSMISSION SYSTEMS

[75] Inventor: Alan H. Cookson, Pittsburgh, Pa.

[73] Assignee: The United States of America as represented by the United States Department of Energy, Washington, D.C.

[21] Appl. No.: 604,352

[22] Filed: Apr. 26, 1984

[51] Int. Cl.[4] .......................... H01B 9/06; H01B 9/04; H02G 5/06
[52] U.S. Cl. .................................. 174/14 R; 174/28; 174/100
[58] Field of Search ...................... 174/14 R, 16 B, 28, 174/99 B, 100, 211

[56] References Cited

U.S. PATENT DOCUMENTS

| 3,515,939 | 6/1970 | Trump | 174/14 R X |
| 3,856,978 | 12/1974 | Sletten et al. | 174/14 R |
| 4,096,345 | 6/1978 | Kemeny | 174/14 R |
| 4,105,859 | 8/1978 | Cookson et al. | 174/14 R |
| 4,161,621 | 7/1979 | Bolin et al. | 174/14 R |
| 4,281,209 | 7/1981 | Yoshioka et al. | 174/14 R |
| 4,440,970 | 4/1984 | Dale | 174/14 R |

Primary Examiner—Laramie E. Askin
Attorney, Agent, or Firm—Bruce R. Mansfield; Walter L. Rees; Judson R. Hightower

[57] ABSTRACT

A particle trap is provided for gas insulated transmission lines having a central high voltage conductor supported within an outer coaxial conductive sheath by a dielectric support member. A cavity between the inner conductor and outer sheath is filled with a dielectric insulating gas. A cone-like particle deflector, mounted to the inner conductor, deflects moving particles away from the support member, to radially outer portions of the cavity. A conductive shield is disposed adjacent the outer sheath to form a field-free region in radially outer portions of the cavity, between the shield and the sheath. Particles traveling along the cavity are deflected by the cone-like deflector into the field-free region where they are held immobile. In a vertical embodiment, particles enter the field-free region through an upper end of a gap formed between shield and sheath members. In a horizontal embodiment, the deflector cone has a base which is terminated radially internally of the shield. Apertures in the shield located adjacent the deflector allow passage of deflected particles into the field-free region. The dielectric support member is thereby protected from contaminating particles that may otherwise come to rest thereon.

19 Claims, 10 Drawing Figures

PARTICLE TRAP FOR COMPRESSED GAS INSULATED TRANSMISSION SYSTEMS

CONTRACTUAL ORIGIN OF THE INVENTION

The U.S. Government has rights in this invention pursuant to Contract No. ET-78-C-01-3029 between the U.S. Department of Energy and Westinghouse Electric Corporation.

BACKGROUND OF THE INVENTION

This invention relates to improvements in high voltage gas insulated equipment, and in particular to systems for minimizing the contamination and resulting high voltage breakdown across internal support insulators.

The use of compressed gas insulated transmission lines has become more widespread in recent years due to the desirability of increasing safety, problems in acquiring right-of-way for overhead lines, higher elevations of power lines required in growing metropolitan areas, and growing demands for electrical energy. Compressed gas insulated transmission lines typically comprise a hollow sheath, a conductor within the sheath, a plurality of solid insulating spacers which support the conductor, and a compressed gas such as sulfur hexafluoride or the like in the sheath to insulate the conductor from the sheath. It is also known to provide a particle trap for compressed gas insulated transmission line as disclosed in the patent to Trump, U.S. Pat. No. 3,515,939. The particle trap of Trump is used to precipitate out of the insulating gas, particles of foreign matter which could adversely affect the breakdown voltage of the dielectric gas.

The present invention is directed to both vertically-oriented as well as horizontally-oriented gas insulated transmission lines. Each orientation requires different approaches to controlling particle contamination. In horizontally-oriented transmission lines, localized low-electric-field regions are provided adjacent a bottom portion of the outer sheath. Contaminating particles, whether conductive or semiconductive, are acted upon by electric fields internal to the transmission line, as well as by gravity, which cause migration of the particles to the low field regions where they are trapped or inactivated. In vertically-oriented transmission lines, particles fall downwardly through the transmission line, and may come to rest on generally horizontally-oriented insulator supports which extend between the energized central conductor and the outer sheath.

U.S. Pat. No. 4,096,345 issued June 20, 1978 to George A. Kemeny, describes a prior art conical insulator suspended between the inner conductor and outer sheath to prevent particles from travelling great distances through the transmission line. The prior art insulator arrangement did not provide a lowered electric field region. As an improvement over that arrangement, the Kemeny patent provided a more effective particle trapping system which had, in addition to a deflecting member, a low field region positioned in the outer sheath. In this arrangement, as in U.S. Pat. No. 3,515,939 issued to Trump, particles directed into regions of lowered field intensity became inactivated, reducing the likelihood that breakdown would be initiated, or that trapped particles would be dislodged during voltage surge conditions.

The arrangement described in the Kemeny patent requires outstruck annular channels to be formed in the sheath adjacent each particle trap. From fabrication, stocking and assembling standpoints, a continuously smooth outer sheath would be preferred. Also, the conical support insulator utilized by Kemeny to deflect contaminating particles has a substantial thickness, is attached at either end to inner conductor and sheath, and must be positioned at a substantial mimimal angle to the inner conductor. As a result, the deflector of Kemeny has a significant field along its surface.

While prior art particle traps offer generally satisfactory dielectric properties, improvements in field shaping with reductions in voltage stresses on particle trap surfaces is always desirable.

Accordingly, it is an object of the present invention to provide a particle trap system having a separate deflector shield which is suitable for use on both horizontally and vertically-oriented gas insulated transmission systems.

Another object of the present invention is to provide a particle trap system which exhibits greater dielectric strength, having reduced voltage stress levels on its surfaces.

It is a further object of the present invention to provide an inexpensive, easy-to-fabricate, non-load-bearing (and therefore thin) deflector member having a lowered electric field along its surface, and which can be mounted at reduced angles to the inner conductor.

It is another object of the present invention to provide an improved particle trap assembly which is compatible with smooth-walled outer sheaths.

SUMMARY OF THE INVENTION

The present invention is directed to compressed gas insulated transmission lines of the type having a central high voltage conductor surrounded by a gas-tight coaxial conductive sheath held at or near ground potential. The cavity between the inner conductor and sheath is filled with a dielectric gas, such as sulfur hexafluoride. A particle trap for conductive or semiconductive particles, residing in the cavity, is provided to prevent contamination and possible resultant flashover along insulator support surfaces extending between the inner conductor and outer sheath.

The particle trap according to the present invention includes a non-load bearing, dielectric cone-like deflector mounted on the inner conductor, for directing particles away from radially interior portions of the cavity in which high-electric fields are present. A conductive shield located adjacent the sheath provides a field-free or near zero-field region between the shield and the sheath. Deflected particles are directed into the field-free region where they are immobilized from further travel. Various arrangements are provided for mounting the inner conductor and/or shield with respect to the outer sheath.

The particle trap arrangement of the present invention can be employed in either vertically or horizontally-oriented gas insulated transmission lines. In one vertically-oriented embodiment, the shield comprises a metal coaxial cylinder spaced radially interior of the sheath to form a field-free region therebetween. The deflector is arranged so as to direct deflected particles into the field-free region through the top of a gap formed between shield and sheath.

In a horizontally-oriented transmission line, a similarly-mounted deflector cone has a base portion located radially interior of a cylindrical shield. Portions of the shield adjacent the deflector base are slotted to allow passage of deflected particles therethrough into a field-free region formed between the shield and the outer sheath.

BRIEF DESCRIPTION OF THE DRAWINGS

In the drawings, wherein like elements are referenced alike.

DETAILED DESCRIPTION OF THE PREFERRED EMBODIMENTS

Figure 1:
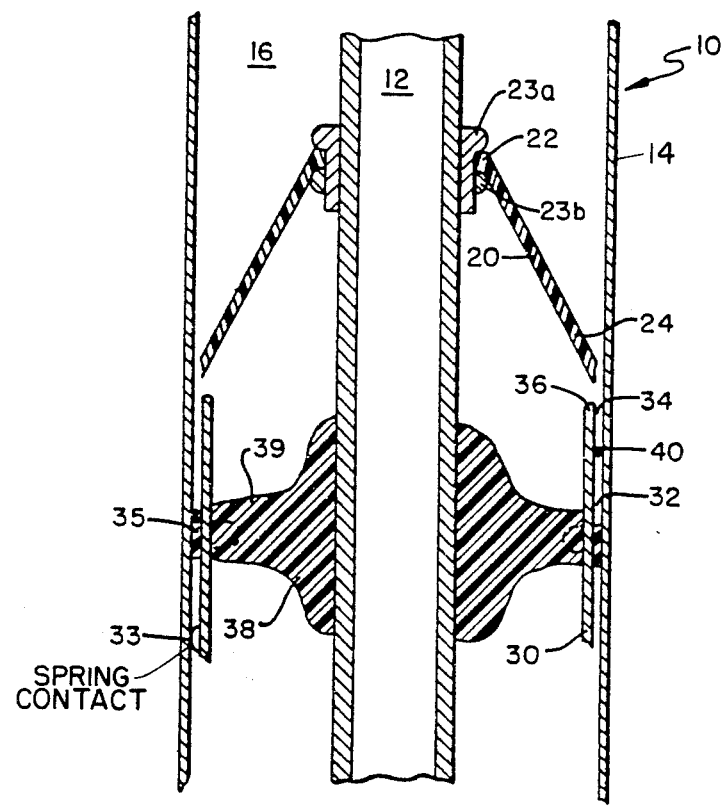
FIG. 1 shows the particle trapping system of the present invention installed in a vertically-oriented compressed gas insulated transmission line.

Referring now to the drawings, and especially to FIG. 1, a compressed gas insulated transmission line 10 is shown comprising a coaxial arrangement of an inner, central conductor 12, arranged within an outer conductive sheath 14. In the preferred embodiment, both conductive members 12, 14 are of elongated cylindrical configuration. The cavity 16 located between inner conductor 12 and outer sheath 14 is filled with an electrically insulating gas, such as sulfur hexafluoride. The gas insulates inner conductor 12, energized at a typical voltage level of 120 Kv to 800 Kv, from outer sheath 14, which is held at or near ground potential.

Not shown in FIG. 1 is at least one support and spacer member which vertically supports inner conductor 12 from sheath 14, to prevent longitudinal dislocation and to maintain concentricity. Examples of the support and spacer members include tripost or spider-like insulator members, such as those shown in the aforementioned U.S. Pat. No. 4,096,345 to Kemeny, which extend between inner conductor 12 and outer sheath 14. The present invention is directed to reducing the contamination of these insulator members and other non-longitudinal-load-bearing members (such as that shown in FIG. 1) that results from impingement by semiconducting or conducting particles that travel through cavity 16. In a vertically-oriented gas insulated transmission line, freely moving particles fall in a downward direction due to the force of gravity, and in a horizontally-oriented gas insulated transmission line they travel along the outer sheath in axial directions, under electrostatic forces that cause levitation and migration. Whether vertically or horizontally oriented, a problem arises when conductive particles come to reside on insulator surfaces (e.g., insulator support surfaces) which obstruct a free passage of the particles along cavity 16. Contamination of the insulator surfaces increases the likelihood of tracking or even of voltage breakdown. The problem increases as the particles reside closer to the inner conductor, where electric field intensities are higher.

As will be seen, the present invention combines separate deflector and shield members with a zero-field region, without requiring extensive modification to existing transmission line components.

Referring again to FIG. 1, an improved particle trapping system comprises a dielectric generally conical particle deflector 20 supported entirely from central conductor 12. Deflector 20 has an apex 22 which is attached to conductor 12 by mounting rings 23a, 23b, that are brazed, welded, or otherwise conventionally affixed to conductor 12. Deflector 20 has a free end or base 24 which is located downstream and radially outwardly of apex 22. Base 24 is described as being located "downstream" of apex 22 in the sense that contaminating particles travel in preferred, predetermined directions. Since the arrangement of FIG. 1 is directed to a vertically-oriented gas insulated transmission line, the predetermined direction of travel is downward, due to the force of gravity.

The particle trapping system of the present invention further requires a conductive, or at least semi-conductive shield 30 positioned immediately adjacent sheath 14 to create a region 32 of "zero" (i.e. zero or near-zero) electric field between shield 30 and sheath 14. Region 32 has an upper entrance 34 formed between the free end 36 of shield 30, and sheath 14. Particles deflected by member 20 enter region 32 throuhg entrance opening 34. The numeral 40 is applied to an exemplary trapped particle. A stop member 35, preferably formed of a dielectric foam, is affixed to the outer surface of shield 30 to block any gaps through which particles may fall. This assures that particles are stopped from further travel.

In the arrangement of FIG. 1, an insulator support 38 is molded around or otherwise affixed to central conductor 12, prior to assembly of transmission line 10. Support 38 can take any convenient form, but preferably comprises a tri-post member, such as that shown in U.S. Pat. No. 4,096,345. In the preferred embodiment, shield 30, a cylindrical conductive band, is affixed to the outer ends of the radially outwardly directed legs 39 of support 38. The completed subassembly thus formed is inserted within sheath 14. To ensure electrical contact between sheath 14 and shield 30, a spring contact 33, mounted to shield 30, is provided. The portion of the inner conductor assembly shown in FIG. 1 is free to slide or reciprocate within sheath 14 during assembly and also during operation of transmission line 10, when different rates of thermal expansion require such movement to relieve stresses between inner and outer conductor assemblies. The vertical loading of the inner conductor assembly can be supported by an arrangement identical to that of FIG. 1 wherein short straps are welded between the bottom of shield 30 and a portion of outer sheath 14 immediately adjacent thereto.

In either event, the particle deflector member is not load-bearing and does not provide support for the inner conductor assembly. The arrangement of FIG. 1 with separate, spaced-apart deflector and shield members, offers improved dielectric strength.

Figure 2:
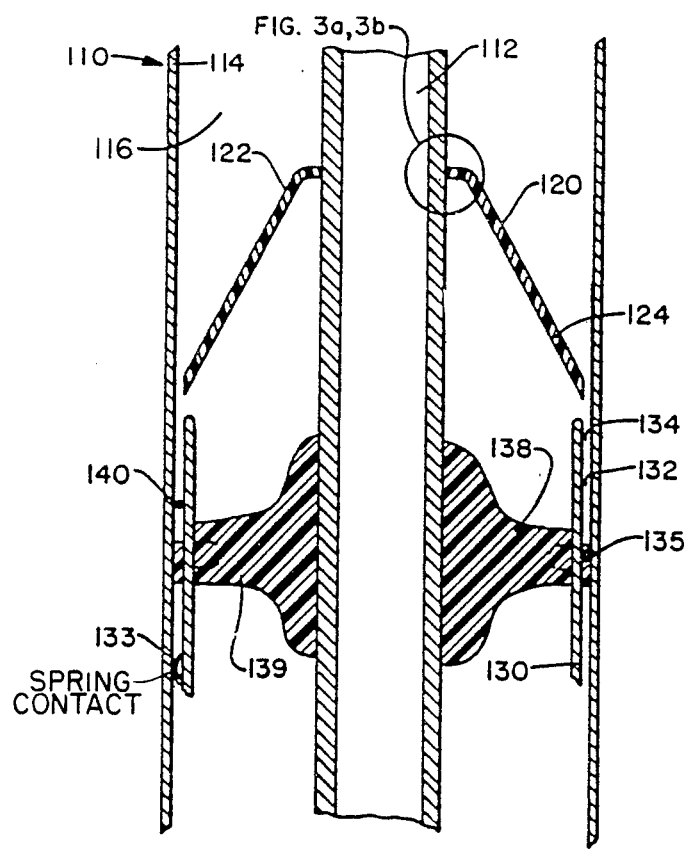
FIG. 2 shows an alternative embodiment of the particle trap of FIG. 1.
Figure 3A:
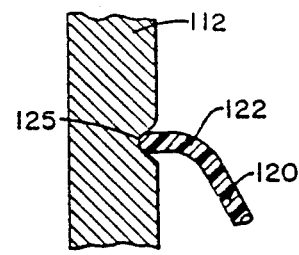
Figure 4A:
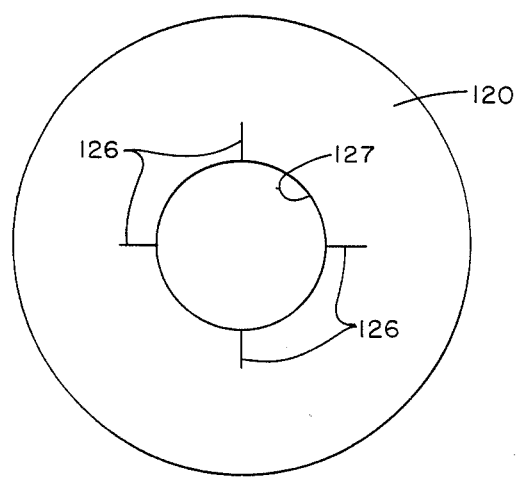
FIGS. 4a, 4b show the particle deflector of FIG. 2 in greater detail.
Figure 4B:
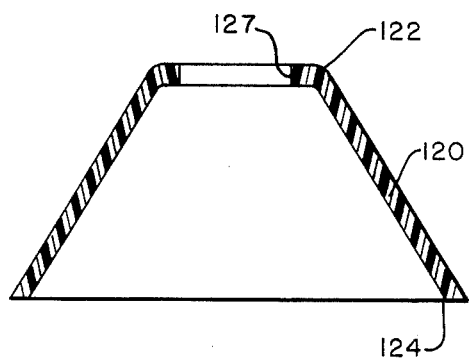

Referring now to FIG. 2, a gas insulated transmission line 110 has a high voltage central conductor 112 coaxially aligned with an outer sheath 114. Cavity 116, formed between conductor members 112, 114, is filled with a dielectric gas such as sulfur hexafluoride. A dielectric particle deflector 120, having an apex 122 and a base 124 is mounted to central conductor 112. Referring to FIG. 3a, the preferred mounting of deflector 120 is accomplished with a snap-fit where a groove 125 is formed in the outside surface of conductor 112. Deflector 120 is made of a resilient material, such that the collar-like apex region 122 is outwardly expanded over conductor 112 as deflector 120 is slid along the central conductor, prior to insertion in groove 125. FIGS. 4a, 4b show deflector 120 in greater detail wherein radially outwardly directed slits 126 are formed in the apex, adjacent a central aperture 127.

Figure 3B:
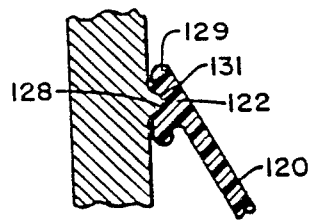
FIGS. 3a and 3b show alternative mounting arrangements for the particle deflector of FIG. 2.

FIG. 3b shows an alternative mounting of deflector 120 wherein an outwardly directed ring-like collar or ridge 128 is formed on the outside surface of conductor 112. In this alternative embodiment, apex 122 includes an enlarged annular terminus or collar 129 having an inwardly directed groove 131 which mates with ridge 128 with a resilient snap fit. Alternatively, deflector 120 can be mounted with mounting rings, as described in FIG. 1, or with any suitable system as is known in the art.

In each of the aforementioned alternatives of FIGS. 3a, 3b, 4a, or 4b, particles are directed to the bottom edge or base 124 of deflector 120, adjacent sheath 114 and a conductive shield member 130. Referring again to FIG. 2, shield 130 provides an elongated zero-field region 132 which lies between shield 130 and sheath 114. Shield 130 is electrically connected to sheath 114 by a spring contact 133, a wire jumper, or the like electrical connection. Particles, such as particle 140, entering the field-free region through an upper entrance 134 are stopped from further travel by a stop member 135, preferably formed of a dielectric foam, affixed to the outer surface of shield 130. Shield 130 is mounted to inner conductor 112 by a spiderlike insulator attachment member 138 having outwardly directed legs 139, such as a tri-post member described in U.S. Pat. No. 4,096,345. Attachment member 138 is affixed to conductor 112 by any suitable method as is known in the art.

As in FIG. 1, vertical support for the inner conductor assembly (including insulator support 138, shield 130 and spring 133) is provided elsewhere. In a typical 60 foot long transmission line section, three support insulators are provided, but only one support insulator is affixed to outer sheath 114. This allows the inner conductor assembly to reciprocate in vertical directions during operation of the transmission line, when inner and outer conductors expand longitudinally at different rates.

Figure 5:
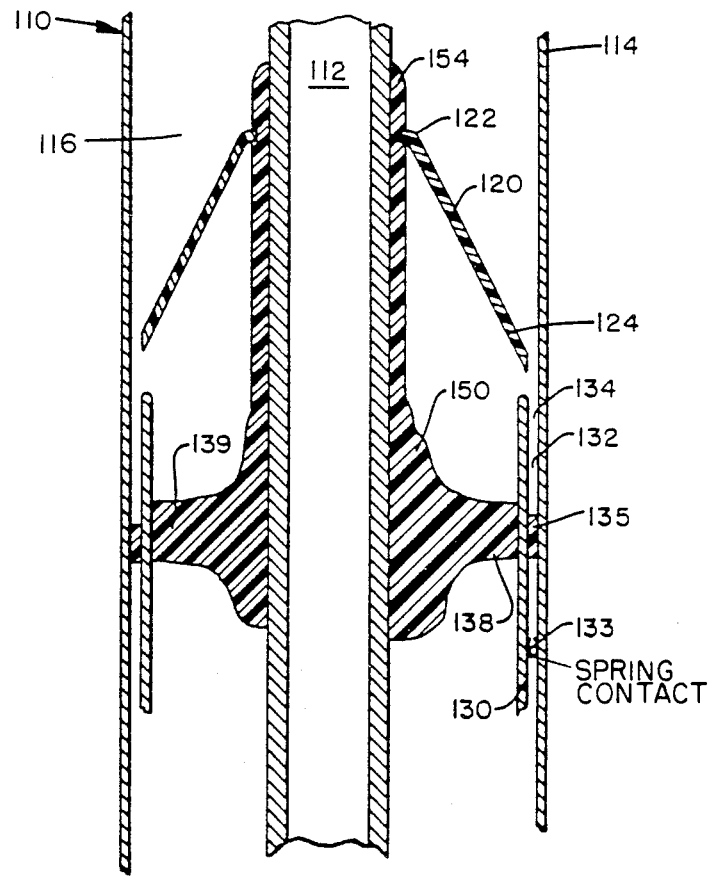
FIG. 5 shows an alternative particle trap embodiment according to the present invention, which incorporates an insulating collar offering improved field-shaping characteristics.

FIG. 5 illustrates an improvement over the embodiment of FIG. 2 wherein like elements are numbered alike, and only the differences over FIG. 2 will be explained. Deflector 120 and spider-like support member 138 are attached to an insulating collar 150 which in turn is secured to conductor 112. In this embodiment, collar 150 provides improved field-shaping along the deflector and shield members, especially at their points of attachment. In particular, collar 150 includes an upper extension 154, which extends beyond the point of attachment of deflector 120, to provide a significant lowering of the electric field in that region. Support member 138 preferably comprises an integral extension of collar 150, conveniently formed from a single epoxy casting. Attachment of deflector 120 to conductor 112 can be by any convenient technique, including any of those described with reference to the foregoing figures.

In the embodiment of FIG. 5, inner conductor 112 is supported at at least one other point along its length. This allows the section shown in FIG. 5 to reciprocate in longitudinal directions under the force of differing thermal expansion rates between conductor members 112, 114. To accommodate this movement, and to maintain an electrical connection between shield 130 and sheath 114, spring 133 is affixed to shield 130, and slides along the inner wall of sheath 114 during construction and operation of the transmission line.

If the arrangement of FIG. 5 were required to provide vertical support for center conductor 112, as well as centering alignment, the outer ends of the outwardly directed legs 139 of support 138 can be attached to sheath 114, as is known in the art. Alternatively, the exposed edge of shield 130 can be brazed, welded or otherwise secured to sheath 114 in any convenient manner.

Figure 6:
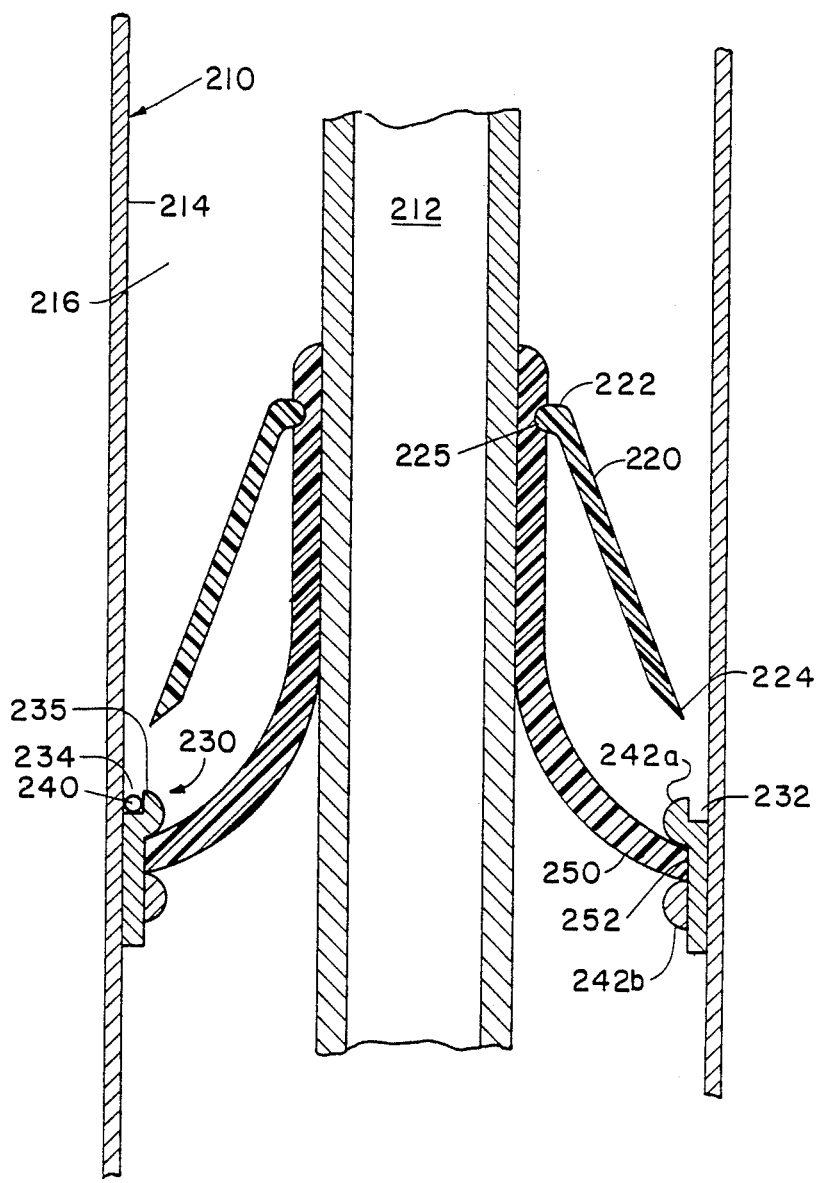
FIG. 6 shows an alternative embodiment of the present invention also employing an insulating collar.

Referring now to FIG. 6, numerals 212, 214 are applied to a high voltage central conductor, and an outer sheath which is held at or near ground potential. As with other gas insulated transmission systems, line 210 contains an inner conductor cavity 216 filled with the dielectric gas. A cone-like particle deflector 220 is connected at its apex 222 to a combined insulator collar/conical support insulator 250, formed of an epoxy or the like material. The preferred mounting of deflector 220 is as described above with respect to FIG. 3a where deflector 220 comprises a resilient cup-like member which is snapped into a circular groove 225 formed on the upper outside surface of insulator 250. A conductive shield member 230 is integrally formed with an upper retaining ring 242a. Upper retaining ring 242a is positioned around the outer periphery of the outwardly directed base portion 252 of collar 250. Lower retaining ring 242b is similarly positioned about the bottom edge of base 252, such that the outer rim of base 252 is secured between upper and lower retaining rings 242a, 242b. Engagement between these members is maintained by a weld or other suitable securement between upper and lower retaining rings 242a, 242b. Upper retaining ring 242a is welded or otherwise secured to sheath 214 in any convenient manner.

Insulator 250 is attached to central conductor 212 by being cast thereon, to provide an improved mounting surface. Rings 242a, 242b are preferably attached to sheath 214 by bolts, by welding, or the like conventional fasteners. In the arrangement of FIG. 6, support 250 provides concentric alignment and vertical support for inner conductor 212 (as well as deflector 220). In addition to the field shaping provided by insulator 250, the dielectric strength of the overall assembly is enhanced by the separate construction of deflector 220 and shield 230. A zero-field region 232 having an upper entrance 234 is formed between the axially directed wall member 235 of shield 230 and sheath 214. The numeral 240 is applied to a particle trapped in that region.

Embodiments heretofore described have been oriented in a vertical direction, to protect against particles falling under the force of gravity. In each instance, the particle deflector directs particles to a region between an electric shield and the outer sheath, where the particle is trapped in a zero or near-zero field region. As will now be explained, the same invention is also readily adapted to horizontal configuration.

Figure 7:
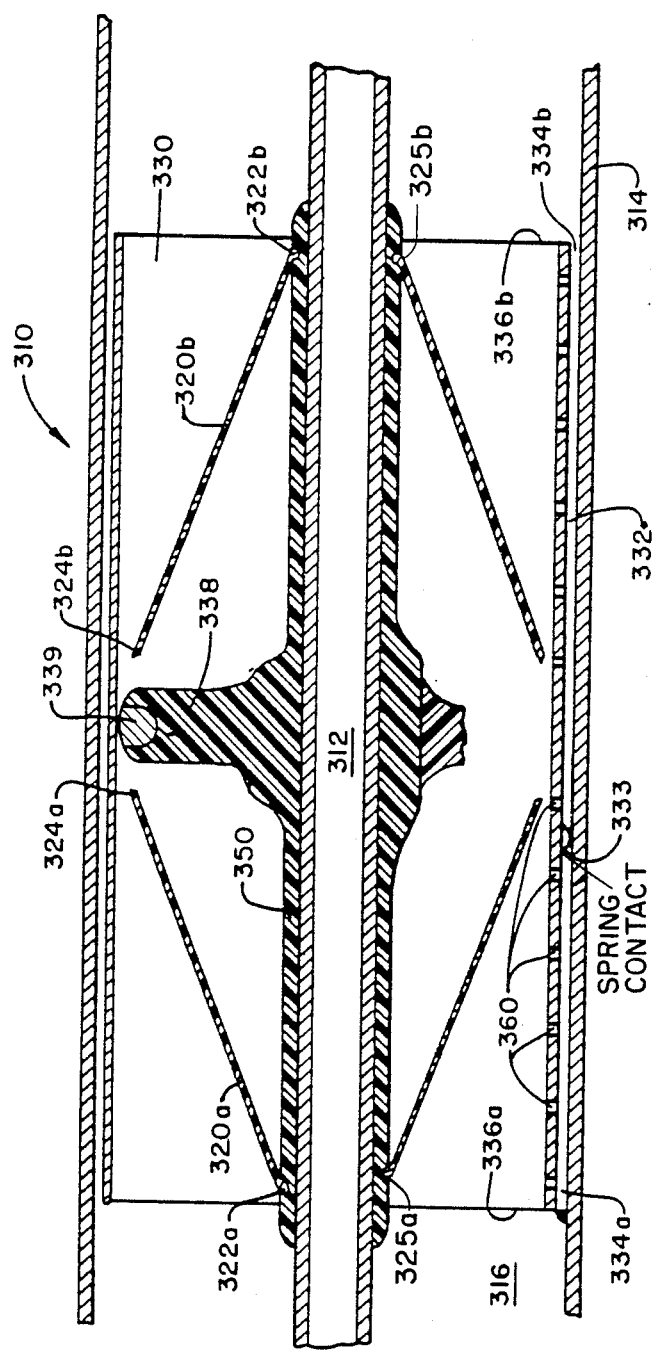
FIG. 7 shows a particle trap system according to the present invention installed in a horizontally-oriented compressed gas insulated transmission line.

Referring now to FIG. 7, a particle trap assembly according to the invention is shown installed in a horizontally-oriented gas insulated transmission line 310. A central conductor 312, energized at a high voltage, is surrounded by an outer conductive sheath 314. The intervening cavity 316 is filled with a dielectric gas to prevent current flow between the conductors 312, 314. Cone-like particle deflectors 320a, 320b are mounted at their apices 322a, 322b to field-shaping insulator collar 350, which is similar to collar 150 shown in FIG. 5. Deflectors 320a, 320b have opposing free ends or bases 324a, 324b. In the preferred embodiment, deflectors 320a, 320b are resilient cups that snap into circular grooves 325a, 325b as described above with respect to FIG. 3a. Any of the other mounting arrangements heretofore described can also be employed, if desired.

Conductive shield 330 comprises a metal cylinder which sets up field-free region 332, with entrance regions 334a, 334b adjacent its free ends 336a, 336b. Support member 338 is attached to inner conductor 312 by any suitable conventional method, such as by being molded thereon. In the preferred embodiment, support 338 and insulator collar 350 comprise an integral molded epoxy member, cast about inner conductor 312. Member 338 provides coaxial alignment for inner conductor 312 and support for shield 330 and deflectors 320a, 320b. Electrical contact between shield 330 and sheath 314 is preferably maintained by spring contact 333 affixed to the outer surface of shield 330. Contact 333 slides along the inner surface of sheath 314 during assembly and operation of transmission line 310, when inner conductor 312 reciprocates in a longitudinal direction, due to different rates of thermal expansion between conductor members 312, 314. In the preferred embodiment, attachment member 338 comprises a tripost spacer element (as described in U.S. Pat. No. 4,096,355) integrally formed with insulator collar 350. If desired, support member 338 can be fixed in place by being bolted at imbedded metal insert 339 to sheath 314, for example.

As explained in the aforementioned patents to Trump and Kemeny, conducting (or semiconducting) particles resting on the bottom of sheath 314 levitate and migrate along the bottom internal surface of that sheath, traveling in both longitudinal directions. Deflectors 320a, 320b direct migrating particles toward slots or apertures 360 formed throughout the length of shield 330. Apertures 360 allow contaminating particles to enter field-free region 332 from radially inner portions of cavity 316. Although this is the principal trapping mode, any particles entering the outer entrances 334a, 334b of zero-field region 332 are also captured. In either event, deflectors 320a, 320b prevent contaminating particles from migrating onto insulator 338.

Figure 8:
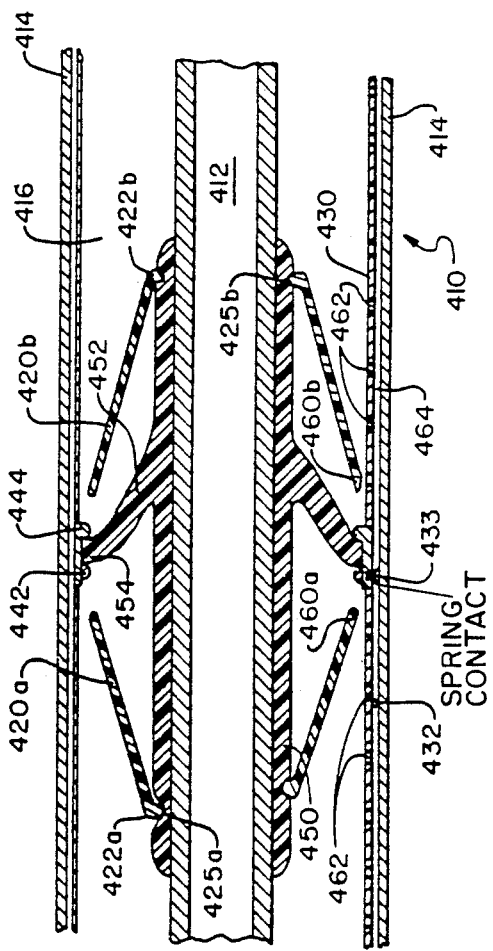
FIG. 8 shows an alternative embodiment of particle trap of FIG. 7, installed in a horizontally-oriented compressed gas insulated transmission line.

Referring now to FIG. 8, a variation of the particle trap assembly of FIG. 7 is shown comprising a collar member similar to that previously described with reference to gas insulated transmission line 210 of FIG. 6. Numerals 412, 414 are applied to a high voltage central conductor, and an outer sheath which is held at or near ground potential, respectively. As with other gas-insulated transmission systems, line 410 contains an inter-conductor cavity 416 filled with a dielectric gas. Particle deflectors 420a, 420b are connected at their apices 422a, 422b to an insulator support collar 450, formed of an epoxy or the like material. The preferred mounting of deflectors 422a, 422b is as described above with respect to FIG. 3a where deflector members 420a, 420b comprise resilient cup-like members which are snapped into circular grooves 425a, 425b formed in the outside surface of collar 450.

Collar 450, which is preferably an integral epoxy member cast about inner conductor 412, includes a cone-like or bell-shaped outwardly flared insulator 452 which is terminated at a free ring-like end 454. Retaining rings 442, 444 are positioned on either side of free end 454, being brazed or welded together to remain in a captive position thereabout. Shield member 430, a cylinder formed of conductive material, is brazed or otherwise conventionally affixed to outer surfaces of ring 444. The assembly described thus far is slid within sheath 414 to form the completed transmission line. Resilient spring-like contact 433, secured to the outer surface of ring 414, provides electrical connection between shield 430 and sheath 414.

If desired, the inner conductor assembly can be left free to slide within sheath 414, so as to be able to reciprocate in response to different thermal heating rates between conductor members 412, 414. Alternatively, the inner conductor assembly can be attached to sheath 414 to provide longitudinal support. Shield 430 can be bolted to sheath 414, or if located adjacent one end of the transmission line section, shield 430 can be brazed or welded to sheath 414.

Under the action of electrostatic forces within the gas insulated transmission line 410, contaminating particles travel across the bottom of sheath 414, being levitated as they migrate in longitudinal directions toward radially inner portions of cavity 416. Radially inner travel of these contaminating particles is limited by deflectors 420a, 420b such that the particles are directed to the free ends 460a, 460b of deflector members 420a, 420b. Particles so positioned are then directed to fall through apertures or slots 462, (formed along the, length of shield 430), so as to enter a field-free region 464 formed between shield 430 and sheath 414. Thus, apertures 462 located along the length of shield 430 allow particles to enter field-free region 464 from radially inner portions of cavity 416. Particles, like 432, that enter the outer free ends of shield 430 will also be trapped.

The term "transmission line" used throughout is intended to include all types of high voltage compressed gas insulated equipment, such as circuit breakers, terminations, and bushings for example. It is understood that the particle trap system of the present invention can be readily adapted to this equipment, if so desired.

It can be seen in each embodiment of the present invention described above, that the deflector and shield members cooperate to provide protection for the inner conductor's insulator support arrangement. In each embodiment, the deflector member is entirely non-load-bearing and can therefore be made very thin, and can be mounted at reduced angles to the inner conductor. As a result, the deflector member of the present invention has a reduced field along its surface, and can be conveniently and inexpensively fabricated.

The embodiments of the invention in which an exclusive property or privilege is claimed are defined as follows:

1. In a compressed gas insulated transmission system having an inner high voltage conductor supported within an outer conductive sheath by a dielectric support member, an improved means for trapping at least partially conductive particles traveling in a predetermined direction within a cavity formed between said high voltage inner conductor and said sheath, comprising:

a dielectric particle deflector supported from said inner conductor, and opening radially outwardly along said predetermined direction;

conductive shielding means disposed immediately adjacent said sheath for creating a reduced-electric field region between said shielding means and said sheath;

connection means for electrically connecting said conductive shielding means to said sheath;

said particle deflector arranged to deflect traveling particles between said shielding means and said sheath so as to be positioned in said reduced-electric field region, such that further travel of said particles within said cavity is prevented and said particles are prevented from impinging upon said dielectric support member.

2. The arrangement of claim 1 wherein said particle deflector comprises a generally cone-shaped member having a first end connected to said inner conductor and a second free end.

3. The arrangement of claim 2 wherein said connection means comprises a resilient conductive strip which generates a spring bias force when deflected, said strip attached at a first free end to said shielding means and having a second free end held in contact with said sheath by said spring bias force.

4. The arrangement of claim 3 wherein said particle deflector is affixed to said inner conductor by retaining rings attached to said inner conductor and said particle deflector.

5. The arrangement of claim 2 wherein said dielectric support member comprises an elongated insulator collar disposed about and secured to said inner conductor, and said deflector and said shielding means are attached to said insulator collar at spaced-apart portions thereof.

6. The arrangement of claim 5 wherein said dielectric support member further includes outwardly-directed insulator support arms integrally formed with said collar and having free ends connected to said sheath to receive support therefrom.

7. The arrangement of claim 1 wherein said particle deflector comprises a cup-like member with a resilient end wall having a central aperture for slidable mounting over said inner conductor; and said inner conductor includes a circular groove formed on its outside surface for receiving portions of said deflector end wall immediately adjacent said central aperture.

8. The arrangement of claim 1 wherein said particle deflector comprises a cup-like member; said inner conductor includes an outwardly directed circular ridge; and said cup-like particle deflector includes a resilient end wall having a central aperture for slidable mounting over said inner conductor, with portions of said end wall immediately adjacent said central aperture including an annular depression for receiving said inner conductor circular ridge.

9. The arrangement of claim 1 wherein:

said shielding means comprises a first conductive ring attached to an inner surface of said sheath, said ring including an axially directed wall member spaced-apart from said sheath, and terminating in a free end;

said dielectric support member comprises an elongated insulator collar disposed about and secured to said inner conductor, said collar including a first free end and a second flared end; and the arrangement further comprises a second ring spaced apart from said axially directed wall member and attached to said first ring, said axially directed wall member and said second ring cooperating to retain said second flared end of said insulator collar which is positioned therebetween.

10. The arrangement of claim 9 wherein:

said particle deflector is secured to said collar, and said collar includes a field-shaping extension portion located between said particle deflector and said first free end of said collar.

11. The arrangement of claim 1 wherein:

said gas insulated transmission line is horizontally oriented;

said particle deflector comprises a cone having a free-end base portion located radially interior of said shielding means; and said shielding means comprises a conductive cylinder having apertures formed therein, such that particles deflected by said deflector are directed through said apertures to said reduced electric field region.

12. The arrangement of claim 11 further including a second particle deflector spaced apart from said one particle deflector, comprising a cone supported from said inner conductor, which opens toward said base of said one deflector and has a free-end base portion; and said shielding means further comprises other apertures, such that particles which travel in a second direction opposed to said predetermined direction are deflected by said second deflector so as to be directed through said other apertures to said field-free region.

13. The arrangement of claim 12 wherein said dielectric support member includes an elongated collar disposed about and secured to said inner conductor, and said one and said second particle deflectors are attached to said collar so as to receive support therefrom.

14. The arrangement of claim 13 wherein said dielectric support member comprises radially outwardly extending insulator arms integrally formed with said collar, and said shielding means is supported by said arms.

15. The arrangement of claim 12 wherein said dielectric support member includes an elongated collar disposed about and secured to said inner conductor, said one and said second particle deflectors are attached to said collar adjacent first and second ends thereof, and said collar includes an outwardly flared support member intermediate of said first and said second ends and having an outer end which is attached to said shielding means so as to receive support therefrom.

16. The arrangement of claim 15 further including first and second spaced-apart rings attached to an inside surface of said shielding means which cooperates to retain said outer end of said flared support member, which is positioned therebetween.

17. In a horizontally oriented compressed gas insulated transmission system having an inner high voltage conductor supported within an outer conductive sheath by a dielectric support member, an improved means for trapping at least partially conductive particles traveling in a predetermined direction within a cavity formed between said inner conductor and said sheath, comprising:

a generally cone-like first dielectric particle deflector secured to said inner conductor and having a free-end base portion which opens radially outwardly along said predetermined direction;

conductive shielding means disposed immediately adjacent said sheath for creating a reduced-electric field region between said shielding means and said sheath;

connection means for electrically connecting said conductive shielding means to said sheath;

said particle deflector arranged to deflect traveling particles between said shielding means and said sheath so as to be positioned in said reduced electric field region; and said shielding means comprises a conductive cylinder having apertures formed therein, such that particles deflected by said deflector are directed through said apertures to said field-free region such that said particles are trapped from traveling further and are prevented from impinging upon said dielectric support member.

18. The arrangement of claim 17 for trapping at least partially conductive particles traveling in said predetermined direction and in a direction opposite to said predetermined direction further including a generally cone-like second particle deflector having a free-end base portion which opens radially outwardly along a direction opposite to said predetermined direction wherein said dielectric support member includes an elongated insulator collar disposed about and secured to said inner conductor, and said first and said second particle deflectors are attached to said insulator collar so as to receive support therefrom.

19. The arrangement of claim 18 wherein said dielectric support member further includes an outwardly-flared bell-shaped mounting member integrally formed with said insulator collar and having a free end; and said arrangement includes first and second spaced-apart rings attached to an inside surface of said shielding means which cooperate to retain said free end of said bell-shaped mounting member which is positioned therebetween.

* * * * *